July 1, 1930.    F. D. HOLDSWORTH    1,768,841
VALVE
Original Filed June 12, 1916    2 Sheets-Sheet 1
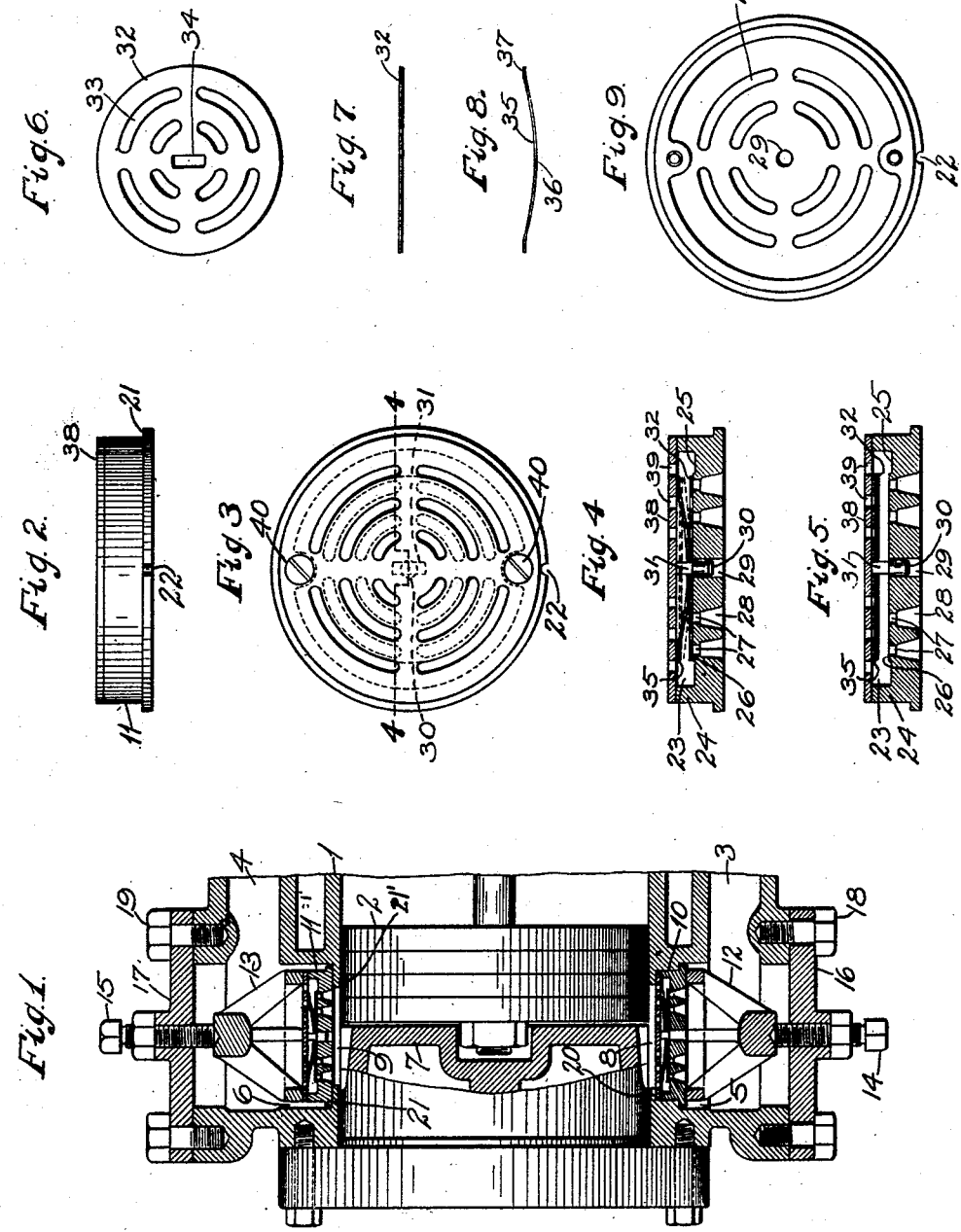
Inventor
Fred D. Holdsworth
By Horace L. [illegible]
Atty.

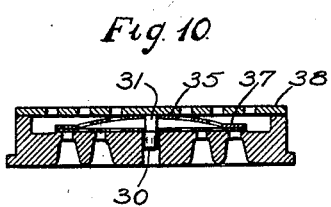
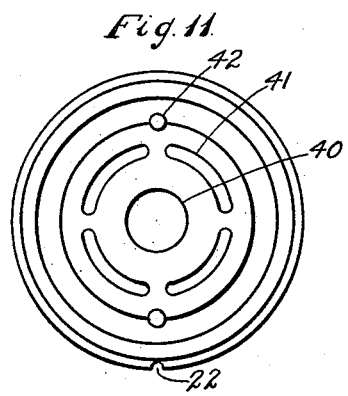
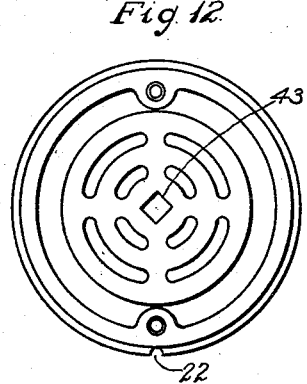
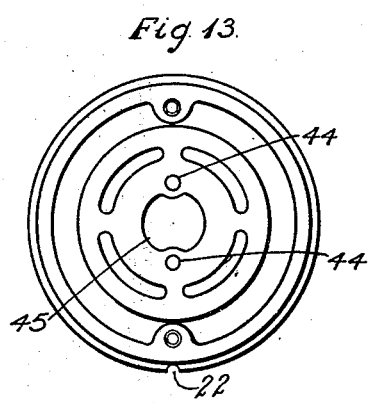
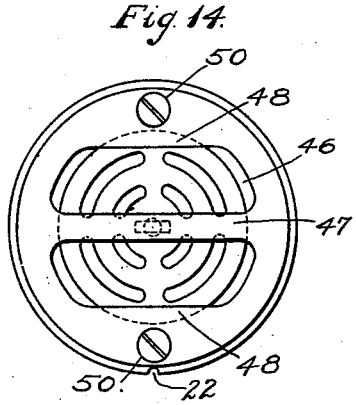
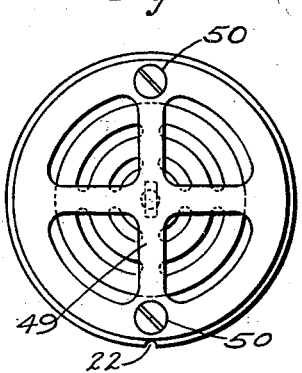

Patented July 1, 1930

1,768,841

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE

Application filed June 12, 1916, Serial No. 103,291. Renewed November 6, 1918. Serial No. 261,413.

My invention relates to valves, and more especially to valves of the flexible type commonly known as plate valves.

It has among its objects to provide an improved valve of the type mentioned having greatly increased area. A further object of my invention is to provide an improved plate valve having improved wearing qualities. A still further and more specific object of my invention is to provide a plate valve of an improved and simplified construction which is especially adapted to use in connection with compressors, the same being of large area, readily inserted or removed, and of such construction that no parts may become separated from the valve and enter the cylinder. These and other objects of my invention will hereinafter appear.

In the accompanying drawings, I have, for purposes of illustration, shown several embodiments which my invention may assume in practice, the same being illustrated as applied to a compressor, although it is to be understood that it is not limited to use in such a machine and may be used in widely different relations.

In these drawings,—

Fig. 1 is a partial vertical sectional view of the compressor cylinder equipped with intake and discharge valves of my improved construction, certain parts being broken away to facilitate illustration.

Fig. 2 is a side elevation of one of the valve cages.

Fig. 3 is a plan view of the same.

Fig. 4 is a sectional view taken on line 4—4 of Fig. 3, the valve mechanism being shown in full lines in its closed position, and in dotted lines in its open position.

Fig. 5 is a view similar to Fig. 4, showing the valve mechanism in its open position.

Fig. 6 is a detail view of one form of valve member.

Fig. 7 is a side elevation of the same.

Fig. 8 is a side elevation of the valve spring, the spring in plan having the same form as the valve shown in Fig. 6.

Fig. 9 is a plan view of the valve cage with the cover plate removed.

Fig. 10 is a sectional view similar to Fig. 4, showing a modified arrangement of the valve spring.

Figs. 11, 12, and 13 show plan views of modified forms of valve seats and valves carried therein, the cover plates being removed.

Figs. 14 and 15 show modified forms of cover plates attached to the cages shown in Figs. 12 and 13, respectively.

The compressor shown is of a standard type, comprising a cylinder 1, having a piston 2 reciprocable therein to draw air into the cylinder from an inlet 3, and discharge air under pressure from the cylinder into an outlet 4, suitable sockets 5 and 6 herein shown as having differently shaped valve receiving means, these sockets being provided on opposite sides of the head 7, adjacent inlet and outlet openings 8 and 9, respectively, to receive containers or cages 10 and 11 containing my improved valve hereinafter described, the cages 10 and 11 being clamped in their sockets and over these openings by suitable clamps 12 and 13 and set screws 14 and 15, which are mounted in cover plates 16 and 17 bolted to the casing by suitable bolts 18 and 19.

It will be noted that, as shown in Fig. 1, each of the valve sockets 5 and 6 is provided with a ledge 20 surrounding its opening 8 or 9, this ledge being either of annular form to produce a circular opening or of any other suitable form to produce an opening of the desired shape. In each of these sockets 5 and 6 a valve carrying element or cage is seated, these cages being disposed one above the other, as shown and each having a flange 21 thereon. The flange 21 of the cage 11 serves to center the cage 11 in the socket 6 wherein it rests on the ledge 20, there being a fluid tight joint between the cage and ledge 20. The flange 21 on cage 10 makes a fluid tight joint with a second ledge 21' formed in the valve socket 5. It will also be noted that in order to insure the cages being properly placed in the sockets, each of these flanges 21 may be provided with a notch 22 (Fig. 2) adapted to receive any suitable pin (not shown) carried in the socket, although, obviously, a reversal of this construction may be used if desired.

These valve carrying elements, or cages, 10 and 11 are of identical interior construction so that a description of the cage 11 will suffice for both. As shown, this cage is provided with a central circular recess 23 in its upper surface forming an annular upstanding wall 24 extending around the edge of the same. In the bottom of this recess and around the outer edge thereof, an annular groove 25 is provided in order to form a readily machined central annular seat 26. As shown, the bottom of this seat 26 is provided with one or a series of concentric slots or ports 27, the slots in each series preferably having an equal area in each quadrant of the valve seat surface. As shown, these slots 27 communicate with lower preferably flared and correspondingly shaped openings or ports 28 in the bottom of the cage member, and are disposed around a central opening 29 in which is seated a pin 30 having an oblong guiding head 31.

Upon the head 31 of this pin, is carried a disc or circular valve member 32 preferably formed of a flexible material, such for instance as sheet steel. In the form of this valve member shown in Fig. 6, it will be noted that the same is provided with a series of slots 33 corresponding in arrangement to the slots 27 in the valve seat, but offset with respect thereto so that when the valve member is laid flat on the valve seat, the slots 27, which form the ports in the latter, are closed by the valve member. As shown, this valve member is also provided with a rectangular slot 34 which enables the same to have free vertical movement with respect to the oblong end or guiding head 31 of the pin 30.

Cooperating with this valve member 32, and likewise guided by the guiding head 31, is a spring 35 preferably formed of the same material, and of the same contour in plan as the valve, but provided with a bowed portion 36 intermediate its ends, and preferably flattened or bent up ends 37. This spring is provided with concentric port openings so located as to coincide with the openings in the valve 32 when the valve is raised and the spring flattened thereby. This spring 35 cooperates with the valve member 32, and in the form of my invention shown in Figs. 1 to 8, is adapted to be disposed above the valve member 32, with its bowed central portion resting upon the latter at a point surrounding the portion 31 of the pin 30 and with its flattened ends 37 engageable with the under surface of a cover plate 38. This plate, in the form shown, also preferably has a series of concentric ports 39 therein, through which the air forced through the ports 27 is adapted to pass when the valve member is raised. It will be noted that this plate 38 is suitably clamped to the cage 11 by means of suitable screws 40 disposed on opposite sides of the same, as shown in Fig. 3.

In the operation of my improved valve, as the air passes out of the compressor it will be noted that, due to the fact that the spring 35 places the valve 32 under pressure along a diametric line, the portions of the valve most remote from the diametric line will tend, when force is applied uniformly over the several parts of the opposite face of the valve, to bend out of position about the line of contact between valve and spring. Therefore, these unrestrained portions of the valve will be raised first from normal position and the valve member will be slightly flexed upon a relatively slight increase in pressure, the bowed central portion 36 of the spring 35 then holding the valve member firmly upon its seat along a diametric line. When, however, the pressure increases, it will be noted that the same will then act to flatten out the spring 35 and both the valve and spring will then be flattened against the under surface of the cover plate, as shown in Fig. 5, the ports in the valve member and spring then registering with the ports in the cover plate. In this position, it will also be noted that the ports 27 in the valve seat are in communication with the slots 39 in the cover plate 38, so that a clear and unobstructed outlet is provided for the air. Obviously, when the air pressure acting upon the under surface of the valve decreases, the central portion of the valve will be first returned to its normal or closed position, due to the expediting action of the spring 35, and the outer portions of the same mentioned will be later returned to position as the pressure further decreases. This lagging action in the valve disc will, however, be relatively slight. The effect of the lagging of the valve parts is a smoother seating action, both on striking against the cover 38 when the valve reaches full open position and on reseating, the effect being that of progressive contact, the different portions tending, so to speak, to roll into place. This reduces liability of valve breakage to a very considerable degree. Of course it will be understood that while I have described the operation of the outlet valve, the operation of the inlet valve will be substantially the same.

In Fig. 10 I have illustrated a modified form of the construction so far described, wherein, instead of the spring 35 having its central portion in engagement with the valve surface at a point surrounding the pin 31, it will be noted that the spring is inverted so that its bowed portion normally rests against the under face of the plate 38, and its flattened edge 37 normally rests against the edge of the valve. In this construction, obviously, the central portion of the valve will first rise from the seat and the pressure of the spring will act to retard the movement of the portions of the valve member at the sides of the pin 30 until the pressure has increased to the desired greater amount. Of course when the pressure is relieved, these portions of the valve in this construction will first return to the seat, the central portion of the same dropping back to its normal position on the seat when the pressure is further decreased.

In Figs. 11, 12, and 13 I have illustrated plan views of modified forms of valve members which may be used, if desired. In Fig. 11, I have shown a valve having a central circular opening 40 and a single series of arcuate slots 41 arranged in different quadrants around the same. In this construction, it will be noted that the valve is adapted to move up and down, and that it is here guided in its movement by a plurality of pins 42 disposed on opposite sides thereof, suitable pin receiving notches being provided in the valve member. In the construction shown in Fig. 12, it will be noted that a valve similar to the valve shown in Fig. 6 is provided, the same, however, being guided in its movement by a suitable rectangular stud 43. In the construction shown in Fig. 13, a valve is shown similar to that shown in Fig. 11, the same in this instance, however, being guided in its movement by studs 44 arranged more closely to a central opening 45. It will, of course, be understood that in the use of each of the above mentioned valve members, springs of corresponding form are preferably used.

In the construction shown in Figs. 14 and 15, I have illustrated modified forms of cover plates which may be used is desired. In Fig. 14, I have shown a form of cover plate wherein a plurality of relatively large parallel openings 46 are provided on opposite sides of a central web 47, these openings preferably having flattened sides formed by ledge-like extensions 48 on their peripheries. In this construction, it will be noted that the web 47, while it overlies only the extreme ends of the ports, at the same time overlies the guiding pin, thereby holding the same securely in position. It should also be noted that the ledges 48 permit of the substantial support of the cage in openings 8 and 9, of corresponding shape. In the construction shown in Fig. 15, it will be noted that four openings are disposed in different quadrants, and that a plurality of intersecting webs 49 are provided, the same likewise overlying only the extreme ends of the ports and serving to hold the pin in position. In each case, of course, the cover plates are suitably secured in position, as for instance, by screws 50.

While I have, in this application, specifically described several embodiments which my invention may assume in practice, it is to be understood that the same is not limited thereto, but may be embodied in various other forms without departing from its spirit, it being my intention to include all such modifications within the scope of the appended claims.

What I claim as new and desire to secure by Letters Patent is:

1. In a valve, a ported valve seat, a valve circular in periphery disposed over the ports thereof, a guard in rigid relation to said valve seat and of greater diameter than said valve, a guiding portion, and a transversely flexed spring, all the elements of whose surface are parallel to the same straight line, engaging said valve along a diametric line and disposed between said guard and said valve and centered by said guide.

2. In a valve, a ported valve seat, a valve circular in contour disposed over the ports thereof, a guard, a guiding portion of uniform cross section throughout its length, and a transversely flexed spring engaging said valve along a diametric line of substantially constant length in all positions of said valve and guided by said guiding portion.

3. In a valve, a valve seat provided with a series of arcuate ports, a valve disposed over the ports thereof and having perforations therein radially spaced from said ports, a spring transversely flexed relative to a single axis and having a series of ports corresponding to the ports formed in said valve, a valve cover having similarly disposed ports, said valve when raised from its seat being adapted to cause coincidence of said last three series of ports.

4. In a valve, a ported seat, a flexible circular valve member thereon having arcuate ports therein, and a bowed spring for retarding the valve opening movement of a portion of said valve member.

5. In a valve, a ported cage, a flexible circular valve member therein having concentric ports, and a spring carried in said cage for retarding the opening movement of a portion of said valve member, said spring likewise being provided with concentric ports therein.

6. In a valve, a ported seat, a flexible circular valve member thereon having concentric ports therein, a spring for retarding the opening movement of a portion of said valve member, said spring likewise being provided with concentric ports therein, and a ported cover plate engageable by said spring.

7. In a valve, a ported seat, a flexible circular valve member thereon having concentric ports therein, a spring for retarding the opening movement of a portion of said valve member, and a ported cover plate engageable by said spring, said cover plate, spring, and valve member having concentric ports therein registering in one position of said valve.

8. In a valve, a concentrically ported cage, a flexible circular valve therein having concentrically disposed ports, a spring carried in said cage retarding the opening movement of a portion of said valve member, said spring likewise being provided with concentrically disposed ports therein, and guiding means for said valve member and spring carried by said cage.

9. In a valve, a ported valve seat, a valve circular in contour disposed over the ports thereof, a guard, and a transversely flexed spring having a radial line contact with said valve and disposed between said guard and said valve and having contact with said guard along parallel lines of material length both in partially and fully opened positions.

10. In a valve, a ported valve seat, a valve circular in contour disposed over the ports thereof, a guard, and a transversely flexed spring having a radial line contact with said valve and disposed between said guard and said valve and having contact with said guard along parallel lines of material length when said valve is midway between full open and closed position.

11. In a valve, a valve seat provided with a series of arcuate ports forming a port annulus, a valve having a continuous annular port closure surface cooperating with said ports, and a transversely flexed spring disposed between said guard and valve and having a line contact with one of said members, which line of contact is of substantially constant length in all positions of said parts, and contacting with the other at loci at each side of said first mentioned line, said last mentioned contacts each extending a substantial distance at each side of a plane perpendicular to said line contact at the central point of the latter.

12. In a valve, a valve seat provided with a series of arcuate ports forming a port annulus, a valve having a continuous annular port closure surface cooperating with said ports, and a transversely flexed spring disposed between said guard and valve and having a line contact with one of said members, and having contacts with the other thereof of material length in a direction parallel to said line contact, whereby tilting of said valve about a line parallel to a perpendicular to said line contact is precluded.

13. In a valve, a valve seat provided with a series of arcuate ports forming a port annulus, a valve having a continuous annular port closure surface cooperating with said ports, and a transversely flexed spring disposed between said guard and valve and having a line contact with one of said members, and having surface contacts with the other thereof including lines of material length parallel to said line contact.

14. In a valve, a valve seat provided with a series of arcuate ports forming a port annulus, a valve having a continuous annular port closure surface cooperating with said ports, and a transversely flexed spring disposed between said guard and valve similar in contour to said valve and having contacts with said valve and guard members, the contact with one of said members being a line contact and the contact with the other of said members including contacts at opposite sides of said line contact, each of said last mentioned contacts including at least one line of contact parallel to said line contact.

15. In a valve, a ported valve seat, a valve circular in contour disposed over the ports thereof, a guard, and a transversely flexed spring having a radial line contact with said valve and disposed between said guard and said valve and having contact with said guard along at least two parallel lines of material length both in the open and closed positions of said valve.

16. In a valve, a ported valve seat, a valve circular in contour and disposed over the ports thereof, a guard and a transversely flexed spring having a line of contact with said valve parallel to the axis of flexure of said spring and disposed between and in contact with said guard and said valve, said spring having at least two lines of contact with said guard which are straight and of appreciable length and substantially parallel to said first mentioned line of contact and which lie at opposite sides of the plane perpendicular to the plane of the valve which includes the line of contact between the valve and spring.

17. In a valve, a ported valve seat, a valve circular in contour and disposed over the ports thereof, a guard, and a transversely flexed spring engaging said valve along a diametric line to which all the elements of the curved portion of said spring are substantially parallel, said spring having a pair of guard engaging portions contacting with the guard at loci respectively at opposite sides of said diametric line, the contacts between said spring and guard being of appreciable length in directions parallel to said diametric line whether said valve be open or closed.

18. In a valve, a valve seat having a series of arcuate ports formed therein, a valve having an unbroken annular portion cooperating with said ports, a guard, and a transversely flexed spring having at all times contact along at least three parallel lines of substantial length with said valve and with said guard, said parallel lines lying in different planes perpendicular to the plane of the valve seat.

19. In a valve, a valve seat provided with a series of arcuate ports forming an interrupted port annulus, a valve having a continuous annular port closure surface cooperating with said ports, and a transversely flexed spring disposed between said guard and valve and having a line contact with one of said members, which line of contact is of substantially constant length in all positions of said parts, and contacting with the other of said members at opposite sides of said first mentioned line, each of said last mentioned contacts including a plurality of spaced points of contact through which a single line substantially parallel to said line contact may pass.

20. In a valve, a valve seat provided with a series of arcuate ports forming an interrupted port annulus, a valve having a continuous annular port closure surface cooperating with said ports, and a transversely flexed spring disposed between said guard and valve and having a line contact with one of said members, and having spaced contacts, each of which is, whether said valve be seated or open, of material length in a direction parallel to said line contact, with the other of said members.

21. In a valve, a ported valve seat, a valve disposed thereon for controlling flow therethrough, said valve having its periphery substantially circular in outline, a guard, and a transversely flexed spring having substantially the same contour as said valve and contacting with said valve and with said guard along at least three substantially parallel lines of material length in all the different positions of said valve relative to said seat.

22. In a valve, a ported valve seat, a valve thereon for controlling fluid flow therethrough, said valve having a substantially circular periphery, a guard substantially circular in outline, and a transversely flexed spring having substantially the same contour as the valve and contacting with said valve and with said guard, two of said contacts, in an open position of said valve being chordal lines which extend from edge to edge of said spring and which are substantially parallel to and at opposite sides of a diametric line which they approach on closing movement of the valve, and the third contact being, in the closed position of said valve, a line contact intermediate and substantially parallel to said chordal lines.

23. In a valve mechanism, a ported seat member, a spaced abutment member, a valve adapted to cooperate with said seat member, and a spring between said valve and abutment engaging one of the same along points in a single straight line and having at opposite sides of said line contacts with the other, each of said last contacts including spaced points in a straight line laterally offset from and substantially parallel to said first mentioned line, said spring comprising a bowed member which progressively diminishes in cross section at each side of said first mentioned line to points adjacent said second mentioned lines and whose flexed surface has all its elements substantially perpendicular to the same plane.

24. In a valve mechanism, a ported seat member, a spaced abutment member, a valve adapted to cooperate with said seat member, and a spring between said valve and abutment engaging one of the same along points in a single straight line and having at opposite sides of said line contacts with the other, each of said last contacts including spaced points in a straight line laterally offset from and parallel to said first mentioned line, said spring comprising a bowed member progressively diminishing in cross section at each side of said first mentioned line from points adjacent said first mentioned line to points adjacent said second mentioned lines and provided with portions beyond said second mentioned lines bent back to lie outside the curved surface of the bowed member extended.

25. In a valve, a valve seat having an annular port arrangement, a valve having an unbroken annular port closure portion, a guard in spaced relation to said seat, and a bowed sheet metal spring the elements of whose bowed surface are all perpendicular to a single plane perpendicular to and bisecting the valve seat, said spring having contact with said guard and valve, one of said contacts being substantially spaced from the center of the valve seat and extending substantial distances on opposite sides of said single plane and another of said contacts being adjacent the center of said valve seat and extending perpendicular to said single plane.

26. In a valve, a ported valve seat, a valve disposed over the ports thereof and having its periphery circular in outline, a guard circular in outline, and a transversely flexed spring having the same contour as the valve and contacting with said valve and with said guard along at least three substantially parallel chords of a circle throughout the opening and closing movements of said valve.

27. In a valve mechanism, a ported seat member, a spaced abutment member, a valve adapted to cooperate with said seat member, and a spring between said valve and abutment engaging one of the same at points in a single straight line and having, when said valve is seated, contacts with the other each of which contacts includes substantially spaced points in one of a pair of straight lines parallel to and at opposite sides of said first mentioned line and comprising a bowed member progressively diminishing in cross section at each side of said first mentioned line from points adjacent said first mentioned line to points adjacent said second mentioned lines.

In testimony whereof I affix my signature.

FRED D. HOLDSWORTH.